Figure 1:
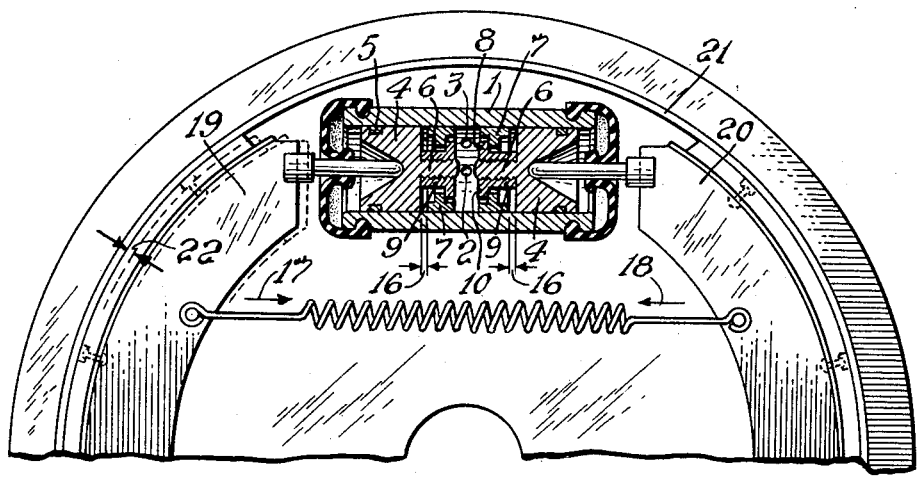

Sept. 1, 1959  A. NAHODIL  2,902,120
APPARATUS FOR THE AUTOMATIC ADJUSTMENT OF CLEARANCE
BETWEEN BRAKE SHOES AND BRAKE DRUM
Filed Feb. 4, 1955

INVENTOR.
Antonín Nahodil
BY

United States Patent Office 2,902,120
Patented Sept. 1, 1959

2,902,120

APPARATUS FOR THE AUTOMATIC ADJUSTMENT OF CLEARANCE BETWEEN BRAKE SHOES AND BRAKE DRUM

Antonín Nahodil, Prague, Czechoslovakia, assignor to Zapadoceske autodruzstvo lidove vyrobni druzstvo, Plzen, Czechoslovakia Application February 4, 1955, Serial No. 486,220

2 Claims. (Cl. 188—196)

The present invention relates to an apparatus for automatic adjustment of the clearance of brake-shoes.

The clearance between the brake-shoes and the brake-drum of motor-vehicles is usually adjusted by hand. Mechanical or hydraulic means for automatic adjustment of the clearance are known, such devices being usually arranged in the space of the brake-shoes and operating either by friction or by means of a system of pawls. The known devices have numerous drawbacks; on the one hand they are not protected against the entry of impurities, such as street-mud etc., and on the other hand they are subject to the influence of corrosion, which changes the coefficient of friction, or they are not sensitive enough to allow fine adjustment.

Hitherto known devices for automatic adjustment, operating on hydraulic principles, have a grave drawback therein, that they require perfect imperviousness of the seals of the regulation mechanism and are subject to the influence of expansion of the liquid at varying temperatures, apart from being considerably complex, delicate and consequently expensive.

The present invention relates to an apparatus for automatic adjustment of the clearance of brake-shoes which is exceptionally simple and free from any influence by the weather, being perfectly protected by its location in the liquid space of the brake-cylinder. The apparatus according to the invention is not subject to the influence of the expanding liquid, because it does not seal the latter, has no sealing surfaces nor packings and, in normal braking operation, does not carry out any movement.

Just one single component, serving for the regulation, carries out one single movement during the whole life-time of the brake lining.

The apparatus adjusts the clearance automatically, continuously and with high sensitivity and accuracy. In the case of failure of the apparatus the operation and safety of the hydraulic brake is in no way influenced. Owing to its simplicity the new apparatus is more reliable than the other known devices, apart from being cheaper.

The substance of the invention resides therein that adjustment means, retained by friction, are provided in a wheel cylinder, said adjustment means cooperating with a shoulder on expansion pistons in such a way, that a movement in axial direction through no more than a clearance necessary for the disengagement of the brake-shoes from the brake-drum is possible between the expansion pistons and the friction adjustment means, said frictional adjustment means being capable to be displaced only by a force produced by the pressure of the liquid during the braking operation.

Figure 2:
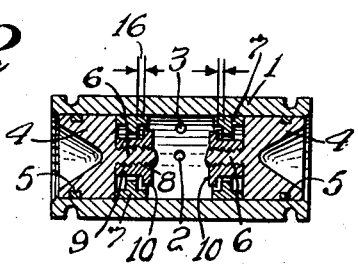
Figure 3:
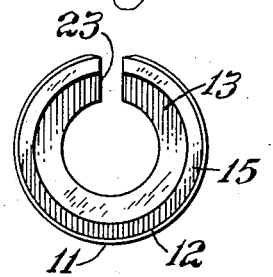
Figure 4:
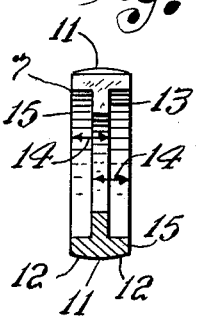

The accompanying drawing shows by way of example one embodiment of the invention. In the drawing:

Fig. 1 represents a part of the wheel in a side-view, the wheel-cylinder and its parts in position during the braking operation being shown in longitudinal section, Fig. 2 is a longitudinal section of the wheel cylinder with its parts in a position corresponding to released braking shoes, Fig. 3 represents the friction ring of the automatic adjustment mechanism in a side-view, and Fig. 4 shows the friction ring in a cross-sectional view.

A normal hydraulic cylinder 1 is provided in its central portion with a filling aperture 2 and exhaust or discharge aperture 3. Working pistons 4 are inserted in the cylinder and sealed by piston rings 5. The pistons 4 are each provided with a projection 6 at the side filled with liquid. An expansion ring 7 is freely fitted over each of the pistons 4 from the side of the projection 6, the ring 7 being secured by means of an abutment or safety member 8. The safety member 8 in the example shown has the shape of a cylindrical body 9 (e.g. nut) provided at one side with a flange or head 10. The cylindrical body or nut member 9 permits adjustment of the axial spacing between the flange 10 and the end face of the respective piston 4. The ring 7 (see Figs. 3 and 4) is made by turning with a slightly larger diameter so that it has to be pressed with a certain force into the cylinder 1.

Its cylindrical outer part 11 has at both sides bevelled edges 12 to facilitate its insertion into the cylinder. A recess 13 is provided in the ring 7, said recess being adapted to freely receive the head or flange 10 of the safety member 8. The dimension 14 from the recess 13 to the side edge 15 is smaller than the length of the shaft portion 9 of the member 8 so that in assembled condition the ring 7 may be displaced on the piston within the limits of the difference of the two distances, marked in the drawing with the reference numeral 16. This difference produces a lateral clearance through which the ring 7 may be freely displaced on the piston 4. After turning the ring 7 may be slit radially, as at 23, or may be given oval formation in order to make it expand to the outside. The large diameter of the surface 11 with respect to the bore of the cylinder 1 has for its purpose to make the ring 7 act as an elastic and at the same time frictional braking element. The force required for the displacement of the ring 7 must be somewhat greater than the retracting force 17 of the spring 18.

The apparatus just described operates as follows:

The brake cylinder 1 is mounted in a known way between the brake-shoes 19, 20 which are retracted into released position by the spring 18. If the brake is released, a clearance 22 required for free rotation of the wheels, is present between the brake-drum 21 and the brake-shoes 19. In the moment of braking (Fig. 1) pressure fluid is supplied by the aperture 2 into the interior of the brake-cylinder 1, said fluid expanding the pistons 4 to both sides until the brake-shoes are fully pressed against the brake-drums. Upon movement of the pistons 4 the safety member 8 displaces the ring 7 by its flange or head 10 engaging the recess 13 of the ring 7. During the braking operation the clearance 16 is present at the outer side of the ring 7 (Fig. 1).

When the brakes are released the braking fluid escapes through the aperture 2 into the main brake cylinder under the influence of the return spring 18, until the pistons 4 abut against the outer edge of the ring 7 (see Fig. 2), so that the clearance 16 is now displaced from the outer side to the inner side of the ring. This clearance 16 determines the size of the adjusted gap or clearance between the brake-shoes and the brake-drum. The ring 7 by its expanding capacity or stemming action and friction, produces in the interior of the cylinder bore a braking resistance which does not allow the piston to move further. During each new maximum depression of the brake pedal the ring 7 is slightly displaced through the difference in the wear of the lining, retaining in this way permanently the same clearance between the brake-drum and the brake-shoes. The brake fluid in the entire space of the cylinder 1 is in free communication through the aperture 2 with the compensating means of the main pressure cylinder so that an increase of the volume of the liquid caused by increased temperature has no influence on the size and adjustment of the clearance, because any excessive liquid may escape through the filling aperture 2. The correct adjustment of all brake-shoes requires only the brake pedal to be heavily pressed down just once and in this way the whole mechanism of the brake-shoes and brake-drum is properly loaded and expanded. This first heavy depression of the pedal causes the self-adjusting mechanism to displace the expansion rings 7 into their extreme position corresponding to the braking action, which involves also elastic deformations of the brake system of the shoes, and after releasing the brake pedal the minimum clearance remains adjusted.

It has been proved in practice that the frictional force of the ring in a space filled with brake fluid, is permanently retained and does not cause any deformation or wear of the surface of the cylinder. The considerable expansion of the liquid by increased temperature has no influence on the size of the adjusted clearance, because the liquid can freely escape from the entire space through the filling aperture 2.

The present invention has in particular the following advantages:

The minimum clearance between the brake shoe and the brake drum is automatically and permanently adjusted over and over again upon each maximum depression of the brake pedal. The minimum clearance of the brake shoes being permanently safeguarded, the consumption of the brake liquid, determined by the stroke of the pedal, is decreased. Consequently it is possible to increase the hydraulic ratio, which means that a main cylinder with a smaller diameter of the piston may be used. It follows that either the same vehicle may be decelerated by a smaller force or a heavier vehicle, which otherwise would require a brake with a servomotor (air), may be braked down by the same original force.

The self adjusting apparatus according to the present invention may be installed in any existing braking mechanism without any changes on the existing cylinders or brake-shoes. The mechanical device for adjustment by hand may be entirely dispensed with. The whole apparatus is extremely simple and permanently enclosed in the interior of the brake cylinder, being in this way protected against damage. The operation of the hand brake has no influence whatsoever on the operation of the seals or on the size of the self adjusting clearance. The apparatus according to the invention is far cheaper than the hitherto known manual adjusting systems and the present automatic adjusting systems.

Instead of using the body or nut 9 with the flange 10, the friction ring 7 may be directly mounted in a groove in the piston. It is further possible to replace the expansion ring 7 by a resistance plate which may have the form of a conical star or by another circular friction member, or the friction ring 7 may be embedded into the cylinder 1 so as to exert its frictional influence upon the outer surface of the piston 4, or any such modification may be carried out without departing from the scope of the present invention.

I claim:

1. An apparatus for effecting automatic adjustment of the clearance between the brake shoes and the brake drum in fluid operated brakes comprising a brake cylinder adapted to be mounted between the free ends of the brake shoes, a retracting spring for returning the brake shoes to inoperative position, expansion pistons slidable in said brake cylinder and adapted to be operatively connected with the free ends of the brake shoes, each of said pistons having means thereon formed with a radially directed flange having a smaller diameter than that of the related piston and spaced axially from an end face of the latter to define an annular groove therebetween, and an adjustment ring for each piston disposed in said cylinder and frictionally retained in adjusted position within the latter, each adjustment ring having an outer portion which is relatively wide in the axial direction and engageable, at one end edge, with said end face of the related piston and a rim which is relatively narrow in the axial direction and projects radially inward from said outer portion into said annular groove so as to be engageable with said flange associated with said related piston, said flange being spaced axially from said end face of the related piston by a distance permitting displacement of the latter relative to the corresponding adjustment ring only sufficient for disengagement of the brake shoes from the brake drum, the frictional resistance retaining said adjustment ring in position in said cylinder being less than the force produced by the pressure of the braking fluid during the braking operation, but greater than the force exerted by said retracting spring.

2. An apparatus as in claim 1; wherein each of said pistons has a threaded extension projecting axially from said end face thereof, and said means formed with a radially directed flange is a nut member screwed on said threaded extension to permit adjustment of the axial spacing between said flange and said end face and corresponding adjustment of the clearance between the brake shoes and brake drum in the released condition of the brake shoes.

References Cited in the file of this patent

UNITED STATES PATENTS

| | | |
|---|---|---|
| 1,755,830 | Loughead | Apr. 22, 1930 |
| 1,800,380 | Fishback | Apr. 14, 1931 |
| 2,100,488 | Rasmussen | Nov. 30, 1937 |
| 2,279,251 | Scott-Iversen | Apr. 7, 1942 |
| 2,587,832 | Frick | Mar. 4, 1952 |

FOREIGN PATENTS

| | | |
|---|---|---|
| 578,038 | Great Britain | June 12, 1946 |